United States Patent [19]

Meranda

[11] 3,714,656
[45] Jan. 30, 1973

[54] DIGITAL SIGNAL PROCESSOR FOR USE IN A HYPERBOLIC RADIO NAVIGATION RECEIVER

[75] Inventor: James I. Meranda, Stony Brook, N.Y.

[73] Assignee: Sperry Rand Corporation, New York, N.Y.

[22] Filed: July 23, 1970

[21] Appl. No.: 57,665

[52] U.S. Cl. .................................................343/103
[51] Int. Cl. ................................................G01s 1/24
[58] Field of Search.......................................343/103

[56] References Cited

UNITED STATES PATENTS 3,319,250  5/1967  Deaner et al. .........................343/103
3,343,169  9/1967  Maine ..................................343/103

Primary Examiner—Benjamin A. Borchelt
Assistant Examiner—Richard E. Berger
Attorney—S. C. Yeaton

[57] ABSTRACT

A compact digital apparatus including a first stage limiter in which received rf navigation signals including Loran C or Loran D pulse groups are limited to a fixed amplitude, a digital gate circuit for sampling the limited signals, a first stage of integration for compressing the samples taken on the received signals into multi-level pulses, a second stage limiter having a variable reference level to which the multi-level pulses are compared and limited in magnitude and a second stage of integration to obtain an automatic frequency control signal in addition to a time difference indication from information contained in the received rf navigation signals.

10 Claims, 3 Drawing Figures

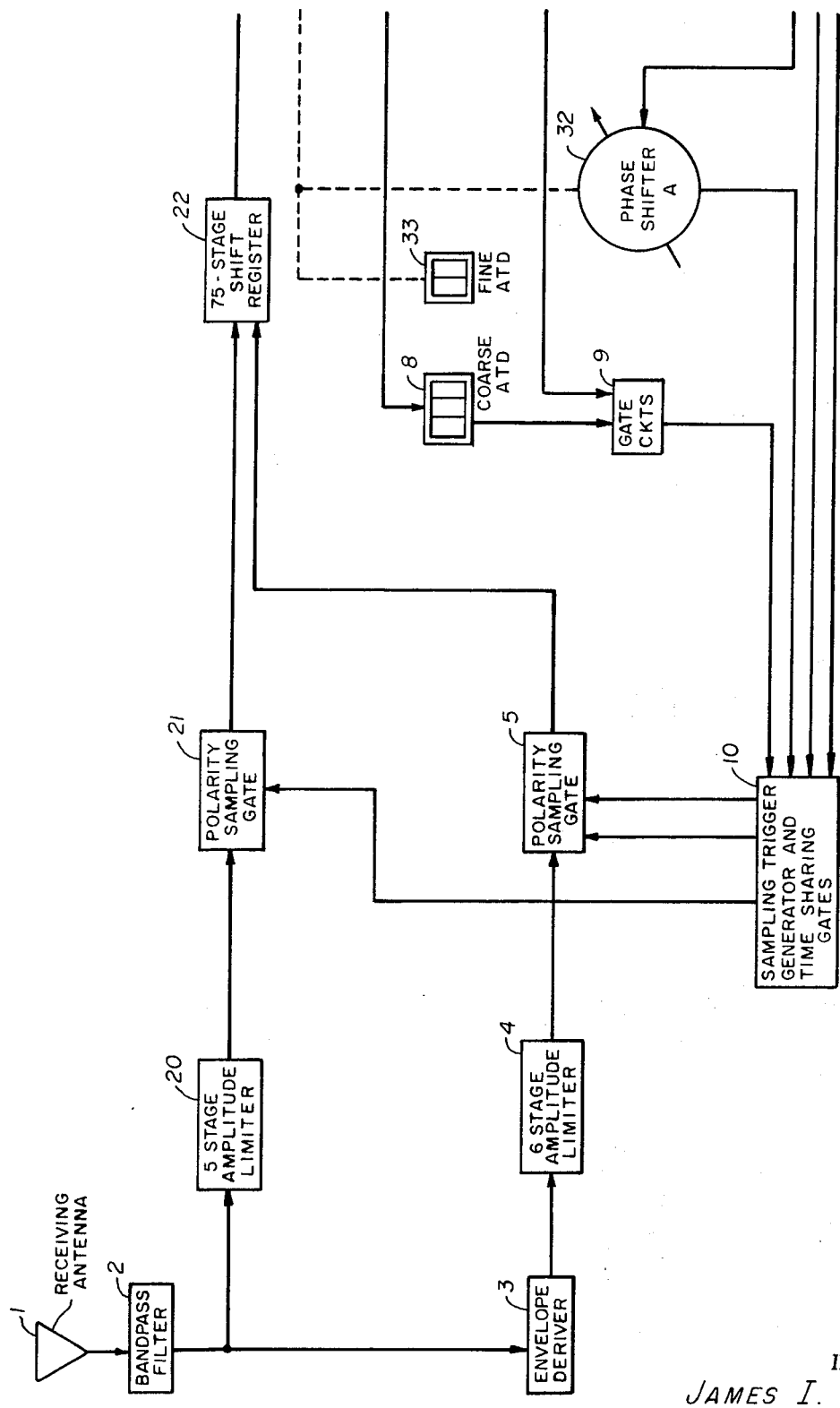

3,714,656

DIGITAL SIGNAL PROCESSOR FOR USE IN A HYPERBOLIC RADIO NAVIGATION RECEIVER

BACKGROUND OF THE INVENTION

1. Field of the Invention

Hyperbolic radio navigation systems use pairs of transmitters located at known locations to transmit radio frequency signals. The time difference between reception of the transmitted signals from each pair of transmitters is an accurate measure of the difference in the distance between the paths of propagation of the signals. The locations of points with a constant difference in distance between each transmitter of a pair is by definition a hyperbola. Each pair of transmitters generate a family of hyperbolas which are represented in chart form on a map of the area serviced by the transmitters. A hyperbolic radio navigation receiver mounted in a vehicle located within the service area determines the time difference from each pair of transmitters. Each time difference corresponds to one line of position, that is, one hyperbola from each family of hyperbolas. The position of the vehicle is determined from the point of intersection of the two lines of position as shown on the chart.

2. Description of the Prior Art

Prior art signal processors for use with hyperbolic radio navigation receivers have employed linear processing or a combination of hard limited signal processing and linear processing. The latter combination includes limiters for limiting the received signals, gate circuits for sampling the phase or amplitude of the limited signals, and digital counters for integrating the samples. The digital number in the counter is a linear indication of the error between the received signals and the sampling pulses in the gate circuits. The digital number is used as the error signal in a linear servo loop to cause a local reference to synchronize the occurrence of the sampling signals with the received signal. The occurrence of the sampling signals is varied by producing digital increments or jumps in the output of the local reference. These digital increments can be made small or large as determined by the application and accuracy required of the receiver. However, increasing the accuracy is obtained at the expense of an increase in the number of circuits used.

In the linear receivers hard limiting of the received signals is not employed. Therefore, automatic gain control (agc) circuits are required to maintain the signal level of the received signals within the sensitivity of the receiver circuits. Linear receivers require a large number of complex circuits to obtain the required synchronization between the sampling signals and the received signals. The present invention eliminates the requirement for agc circuits which results in less complex circuits and thereby enables construction of an economical compact digital processor.

SUMMARY OF THE INVENTION

In the present invention hyperbolic radio navigation signals including Loran C or Loran D signals are received by the antenna, amplified and filtered in the filtering circuits to reduce atmospheric noise and radio interference. The filtered signals are then amplitude-limited and phase-sampled to obtain bi-level digital data. This data is compressed into a single analog multi-level pulse for a predetermined number of samples. The compressed pulse is amplitude-limited to form bi-level data which is integrated. The integrated bi-level data provides automatic frequency control signals for synchronizing the sampling pulses to the received signals including Loran signals and also provides an indication of time difference information which is used in a display device to provide a visual readout. This digital processing device completely eliminates the requirement for linear processing circuits, thereby enabling the receiver to be reduced to a size that can be readily transported as a backpack by a single person.

BRIEF DESCRIPTION OF THE DRAWINGS

FIGS. 1a and 1b are simplified block diagrams of a Loran C-Loran D tracking receiver incorporating the invention.

DESCRIPTION OF THE PREFERRED EMBODIMENT

The preferred embodiment will be described with reference to a Loran C-Loran D hyperbolic navigation receiver but it will be understood by those skilled in the art that the invention is not restricted to Loran receivers but can also be incorporated into other types of hyperbolic navigation receivers.

A Loran C or Loran D system is a hyperbolic navigation system which processes radio frequency (rf) pulse groups radiated from a chain of remote Loran transmitters. A chain of Loran transmitters consists of a master station and a plurality of slave stations. The master station precisely maintains the assigned repetition rate and carrier frequency of the transmitted pulse groups and monitors the synchronization, accuracy and stability of the slave stations transmitted pulse groups. Each slave station maintains an accurate fixed delay between reception of the master pulse groups and transmission of its own pulse groups.

The determination of position is made by measuring the difference in time of arrival of radiated pulse groups from each slave station relative to the time of arrival of corresponding pulse groups from the master station. Each respective time difference measurement establishes a hyperbolic line of position along which the receiver is located. The intersection of two or more of these lines of position establishes the location of the receiver relative to the transmitters. In a Loran C or Loran D tracking receiver a concise time difference measurement is made using the carrier components of the received master and slave pulse groups; that is, the time difference is determined by measuring the phase difference between carrier cycles of the pulses within the master and slave pulse groups. In order to resolve the cyclic ambiguity inherent in such a time or phase measurement, one master carrier cycle and one slave carrier cycle are selected with the aid of the envelope characteristics of the received pulses. The envelope control selection assures that the carrier measurement is made between precisely corresponding carrier cycles.

Figure 1B:
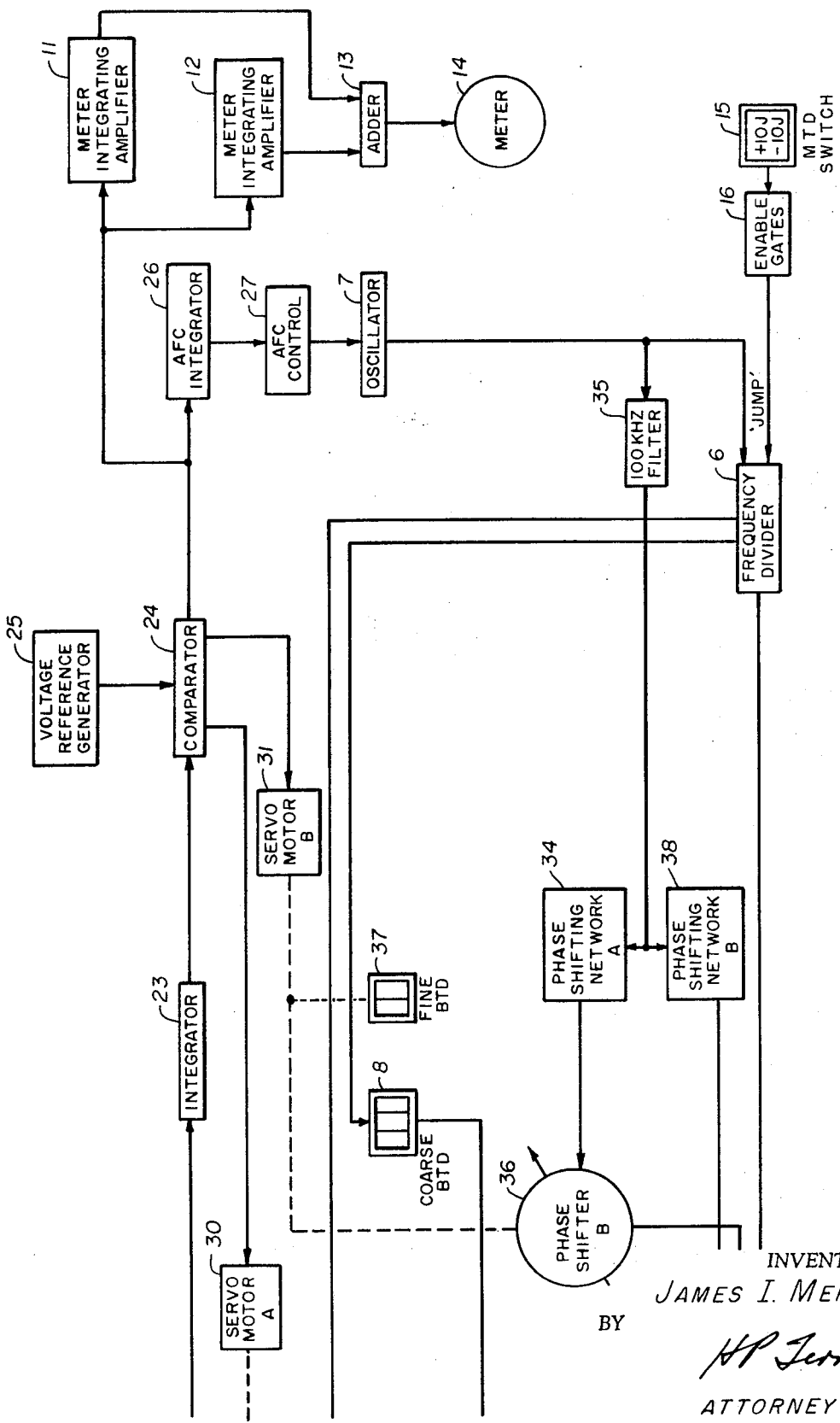

Referring to FIG. 1, Loran C or Loran D master and slave pulse group navigation signals are received by an omnidirectional receiving antenna 1 and applied to a bandpass filter 2 for amplification and filtering to reduce atmospheric noise and interference. The filtered pulse group signals are coupled to a 5-stage rf amplitude limiter 20 and an envelope deriver 3.

The 5-stage rf amplitude limiter 20 is the input to the cycle tracking loop which will be discussed in detail below. In the envelope deriver circuit 3, which is the input of the envelope tracking loop, the carrier signal of each received pulse is attenuated and delayed by one-half a carrier cycle. Assuming a carrier frequency of 100 kHz the delay time of one-half a carrier cycle is 5 microseconds, the delayed carrier signal is combined with the attenuated carrier signal to produce, after amplification and inversion, a "derived" waveform such as the waveform in FIG. 2. The derived envelope pulse is distinctive in that the first part of the waveform preceding the envelope null is in phase with the received pulse and the second part is 180° out of phase with the received pulse. Since the envelope deriver output signal is an undetected signal, the waveform shown is of the derived carrier cycles not a detected envelope. A typical envelope deriver is described in United States Coast Guard Technical Manual for Loran Receiving Set AN/SPN-30 of November 1961 identified by the Coast Guard publication number CG-273-81. The output pulses of envelope deriver 3 are applied to a 6-stage amplitude limiter 4 to produce square wave pulse group signals. The waveform of FIG. 2 typifies a single pulse of such a pulse group. The derived envelope square wave pulse groups from the 6-stage amplitude limiter 4 are applied to an envelope polarity sampling gate 5. Two envelope sampling triggers separated in time by 10 microseconds sample each pulse of a pulse group in the polarity sampling gate 5. The frequency divider 6 reduces the 100 kHz basic Loran frequency signal from the oscillator 7 to 10 kHz, 1 kHz, 100 Hz and 10 Hz and applies these frequencies to the ATD and BTD coarse time difference switches 8. The ATD and BTD coarse time difference switches 8 are set by the operator to the expected time difference for the location of the receiver. These switches enable gates corresponding to the master and slave pulse groups to be applied to gate circuits 9 to produce a 2 kHz series of pulses which are applied to the sampling trigger generator 10. A prior art device for performing this function is described in U.S. Pat. No. 3,166,716 entitled, Generator System Producing Positionable Output Pulses Employing Beam Switching Tubes and Ganged Rotatable Switches, issued to Ronald K. Rockwell on Jan. 19, 1965.

Figure 2:
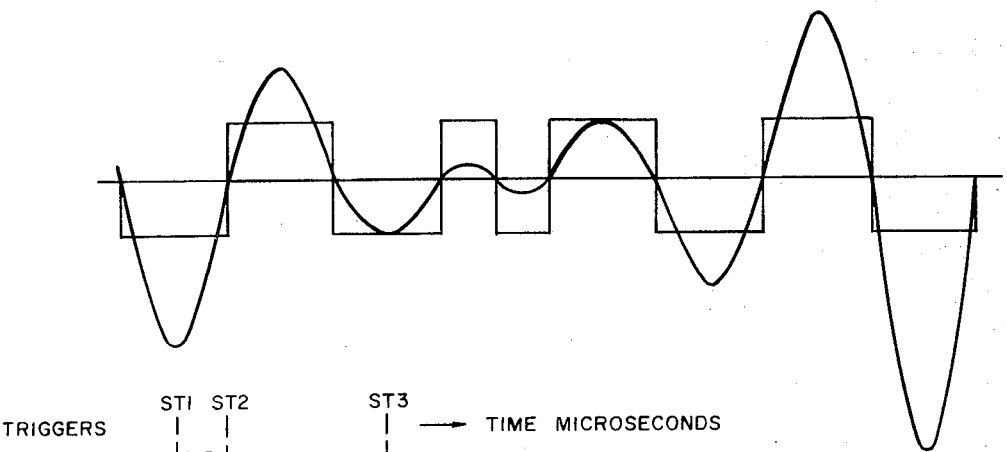
FIG. 2 is a series of idealized specifically shaped waveforms derived from the master and slave pulse groups.
Figure 2:
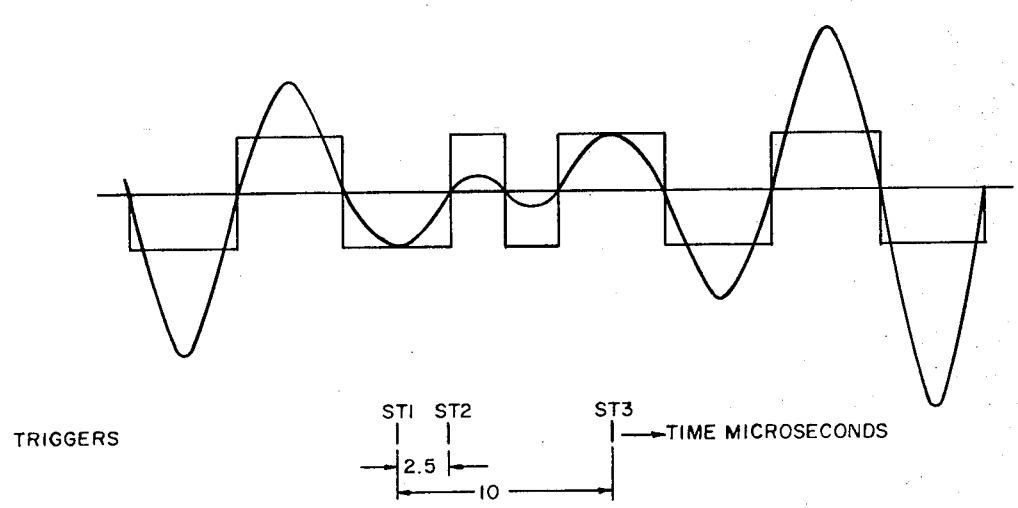
Figure 2:
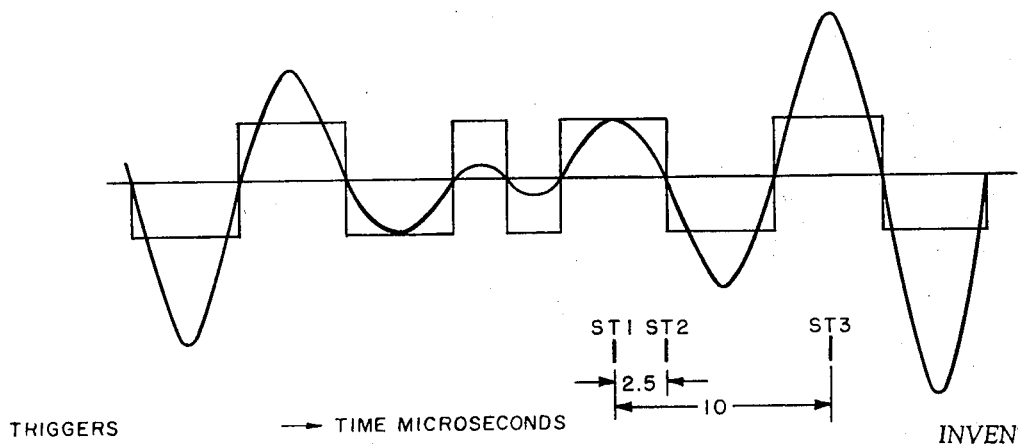

The sampling trigger generator 7 produces a group of three sampling triggers for each 2 kHz pulse received. The second sampling trigger of the group of three is delayed 2.5 microseconds with respect to the first sampling trigger. This second sampling trigger is referred to as the cycle sample trigger and is used to sample the zero cycle crossover. The first and third sampling triggers are referred to as the envelope sampling triggers and are separated by 10 microseconds. In FIG. 2 the occurrence of the envelope sampling triggers are shown in three different positions with respect to the envelope null. The first envelope sample triggers shown occur before the envelope null and both triggers are sampling negative cycle peaks. The second envelope sampling triggers shown straddle the envelope null. The first of this pair of triggers is sampling a positive cycle peak and the second is sampling a negative cycle peak. The third envelope sampling triggers shown occur after the envelope null and both triggers are sampling positive cycle peaks. The envelope sampling triggers are spaced 10 microseconds apart and are taken on each derived pulse of each master and slave pulse group. Samples taken by each trigger of a pair of envelope sampling triggers are processed separately in a 75-stage shift register 22, an integrator 23 and a comparator 24 in the same manner as the cycle samples to be described later. The comparator outputs corresponding to the first sampling triggers of each pair are integrated in a meter integrating amplifier 11 and those corresponding to the second sampling trigger of each pair are integrated in a meter integrating amplifier 12. After integrating and smoothing in the meter integrating amplifiers 11 and 12, the output data is added algebraically and applied to a null meter 14.

In FIG. 2 when the envelope sampling triggers occur before the envelope null and sample negative cycle peaks, the signal from the adder 13 will be a net negative signal causing a negative deflection to appear on the null meter 14. Conversely, when the envelope sampling triggers occur after the envelope null and sample positive cycle peaks, the signal from the adder 13 will be a net positive signal causing a positive deflection to appear on the null meter 14. Occurrence of the envelope sampling triggers straddling the envelope null will result in a net zero signal causing a null indication to appear on the null meter 14. The envelope sampling triggers are used to give the operator an indication that the correct carrier signal is being sampled. If a negative deflection appears on the null meter 14, the operator deflects the MTD switch 15 to the −10J position which produces a −10 microsecond digital increment or jump. The −10 microsecond jump is applied to the frequency divider 6 via the enable gates 16. The subsequent envelope sampling triggers are delayed 10 microseconds causing them to move toward the envelope null. If a positive deflection appears on the null meter 14, the operator deflects the MTD switch 15 to the +10J position which produces a +10 microsecond jump. The +10 microsecond jump is also applied to the frequency divider 6 via the enable gates 16 and the subsequent sampling triggers occur 10 microseconds earlier thereby approaching the envelope null. This process is continued until the null meter 14 indicates a null and the operator knows the correct carrier signal is being sampled.

The 5-stage amplitude limiter 20 at the input of the cycle tracking loop receives the filtered pulse group signals from the bandpass filter 2 and produces square wave pulse group signals. The output square wave pulse group signals are applied to a polarity sampling gate 21 which samples the phase of each pulse of the master and slave pulse group signals at the zero cycle crossover corresponding to an envelope null of the derived envelope. The output pulses of the polarity sampling gate 21 for each master and slave pulse group are applied to the 75-stage shift register 22 for storage. Within the shift register 22 data is shifted at a 100 microsecond rate from stage to stage. An output is taken from every 10th stage in a Loran C receiver which produces 8 outputs from shift register 22 whereas an output is taken every 5th stage in a Loran D receiver which produces 16 outputs from shift register 22. These outputs or tap lines are fed to the integrator 23. Each output of the shift register 22 connects to a resistor in a resistive matrix in the integrator 23. The state of each output line from the shift register 22 is either a logic zero or one as represented by either a ground or a "high" potential thus controls the current flow in the resistive matrix. In this manner the data simultaneously present on all input taps of the shift register 22 is converted to an analog voltage in the integrator 23. The magnitude of this analog voltage represents a summation of the potentials on the outputs from the shift register 22. When all the pulses in a Loran pulse group have been sampled there will be a 100 microsecond interval when the data at each of the register taps represents the sampled data of each pulse in the group. At that time, the data for the pulse received first will be at the last tap and the last pulse data will be at the first tap (just entering the shift register 22).

The analog voltage output from the integrator 23 is a single multi-level pulse for each master and slave pulse group. This analog output is applied to the comparator 24 for comparison with a reference voltage generated in a reference generator 25. There are 17 levels or states which the analog voltage output from the integrator 23 can assume bounded by the conditions that all taps are at logic zero or all taps are at logic one. Because the cycle tracking loop is a null-seeking servo loop which is in equilibrium when the cycle sample is taken at a cycle crossover on the Loran pulse, the reference level is set to one-half the range of the analog output voltage. In a Loran D receiver every 5th stage of the 75-stage shift register 22 has an output potential representative of the sampled data of each pulse in a pulse group. Therefore, the average value of these 16 outputs would be 8. However, in a Loran C receiver only every 10th stage of the 75-stage shift register 22 has an output potential representative of the sampled data of each pulse in a pulse group. Therefore, if a particular receiver is to function as either a Loran C or a Loran D receiver, then during Loran C operation one-quarter of the outputs in the 75-stage shift register 22 must be artificially forced high and one-quarter forced low. Sampling of 8 Loran C pulses will then add an average level of four producing a total average value of 8 which is equal to the reference level. In the comparator 24, a polarity decision is made that results in either a logic one output which represents a positive error or a logic zero output which represents a negative error.

The output signal of the comparator 24 is sampled during 100 microsecond intervals and the output corresponding to the master pulse group is applied to an AFC integrator 26 which produces a filtered d.c. AFC control voltage applied to the oscillator 7 via an AFC control unit 27. The oscillator 7 is the source of the basic receiver frequency signal and it provides an output which is applied to the frequency divider 6 for generation of the sampling triggers used in the polarity sampling gates 5 and 21. The summation of the sampled data in the AFC integrator 26 adjusts the average polarity of the AFC voltage and controls the frequency of the oscillator 7 via the AFC control unit 27 to assure that the sampling instant for the master pulse occurs precisely at the cycle crossover. The output signal of the comparator 24 is again sampled during 100 microsecond intervals and the outputs corresponding to the slave pulse groups are applied to low-power, low-speed, brushless servo motor A 30 and servo motor B 31. Servo motor A 30 drives a phase shifter A 32 and a fine ATD (A time difference) cycle dial 33 through appropriate gearing. The mechanical drive applied to the phase shifter A 32 rotates the phase of a 100 kHz reference signal from the oscillator 7 applied to the phase shifter A 32 through a phase shifting network A 34 and a 100 kHz filter 35. The output from the 100 kHz phase shifter A 32 is used in the summation of the A sampling trigger sequence. The servo motor A 30 is driven by the output signal from the comparator 24 which corresponds to the A sampling trigger sequence until the 100 kHz phase shifter A output is in phase with the phase of the received Loran signal from the A slave transmitter. The phase angle of the phase shifter A 32 is therefore directly proportional to the fraction of a cycle phase shift between the rf signal from the master transmitter (100 kHz reference) and the rf signal from the A slave transmitter. The fine ATD cycle dial 33 thus displays the time difference in fractions of a cycle which constitutes the fine A time difference reading. The B channel operates identically to the A channel, that is, servo motor B 31 drives a phase shifter B 36 and fine BTD cycle dial 37 through corresponding appropriate gearing. The mechanical drive applied to the phase shifter B 36 rotates the phase of the 100 kHz reference signal from the oscillator 7 applied to the phase shifter B 36 through a phase shifting network B 38 and the 100 kHz filter 35. The output from the 100 kHz phase shifter B 36 is used in the formation of the B sample trigger sequence. The servo motor B 31 is driven by the output signal from the comparator 24 which corresponds to the B sampling trigger sequence until the 100 kHz phase shifter B output is in phase with the phase of the received Loran signal from the B slave transmitter and the fine BTD cycle dial 37 displays the B time difference reading.

While the invention has been described in its preferred embodiment, it is to be understood that the words which have been used are words of description rather than limitation and that changes may be made within the purview of the appended claims without departing from the true scope and spirit of the invention in tis broader aspects.

I claim:

1. In a hyperbolic navigation receiver a digital signal processor comprising first limiter means for amplitude limiting signals received by said receiver, gating means coupled to said limiter means for obtaining a plurality of samples from said limited received signals, first integrator means responsive to said plurality of samples and compressing said plurality of samples into multi-level pulses, second limiter means coupled to said first integrator means for comparing said multi-level pulses with a reference level to produce difference signal outputs, and second integrator means for receiving and integrating said difference signal outputs to provide integrated output data which is indicative of the navigation information contained in said received signal.

2. In a hyperbolic navigation receiver a digital signal processor comprising first limiter means for amplitude limiting signals received by said receiver, gating means including trigger pulses positionable in time coupled to said limiting means for obtaining a plurality of samples from said limited received signals only during the occurrence of said trigger pulses, first integrator means responsive to said plurality of samples and compressing said plurality of samples into multi-level pulses, second limiter means coupled to said first integrator means for comparing said multi-level pulses with a reference level to produce difference signal outputs, second integrator means for receiving said difference signal outputs and providing integrated data outputs, control means responsive to said integrated data outputs for providing time displacement of said positionable trigger pulses prior to sampling said limited received signals, and display means responsive to said integrated data output for providing a visual readout of the navigation information contained in said received signals.

3. In a hyperbolic navigation receiver a digital signal processor comprising first limiter means for amplitude limiting signals received by said receiver, gating means coupled to said limiter means for obtaining a plurality of polarity samples from said limited received signals, first integrator means responsive to said plurality of polarity samples and compressing said samples into multi-level pulses, second limiter means coupled to said first integrator means for comparing said multi-level pulses with a reference level to produce polarized difference signals and second integrator means for receiving and integrating said polarized difference signals to provide integrated output data which is indicative of the navigation information contained in said received signals.

4. In a Loran tracking receiver for indicating the time difference between received Loran master and a plurality of Loran slave pulse groups a digital signal processor comprising first limiter means for converting said received Loran pulse groups to square wave pulse groups, pulse sampling means connected to said first limiter means for sampling phases of particular cycles within each pulse of said square wave pulse groups producing sample signals representative of said sampled phases, first integrator means responsive to said sample signals and compressing said sample signals into multi-level pulses, second limiter means connected to said first integrator means which compares said multi-level pulses to a locally generated voltage level producing limited output signals, second integrator means coupled to said second limiter means and summing said limited output signals to produce integrator outputs indicative of said time difference between said received Loran pulse groups; and indicator means responsive to said integrator outputs for providing a visual display of said time difference between said received Loran pulse groups.

5. In a Loran tracking receiver for indicating the time difference between received Loran master and a plurality of Loran slave pulse groups a digital signal processor comprising first limiter means for converting said received Loran pulse groups to square wave pulse groups, envelope deriver means for obtaining derived pulse groups from said received Loran pulse groups, second limiter means for converting said derived pulse groups to square wave derived pulse groups, pulse sampling means connected to said first and second limiter means for sampling phases of particular cycles within each pulse of said square wave pulse groups and square wave derived pulse groups producing sample signals representative of said sampled phases, first integrator means responsive to said sample signals and compressing said sample signals into multi-level pulses, third limiter means connected to said first integrator means which compares said multi-level pulses to a locally generated voltage level producing limited output signals, second integrator means coupled to said third limiter means and summing said limited output signals to produce integrator outputs indicative of said time difference between received Loran pulse groups and indicator means responsive to said integrator outputs for indicating the time difference between said received Loran pulse groups.

6. In a Loran tracking receiver as described in claim 5 in which said pulse sampling means includes integrated pulse sampling circuits which conduct only during the occurrence of positionable trigger pulses, and control means responsive to said integrator outputs for providing time displacement of said positionable trigger pulses prior to sampling said phases of particular cycles.

7. In a Loran tracking receiver as described in claim 5 in which said first integrator means includes a tapped shift register and a summation network.

8. In a Loran tracking receiver as described in claim 7 in which said summation network includes a resistive matrix.

9. In a Loran tracking receiver as described in claim 5 in which said second integrator means includes the parallel combination of electronic integrators and servo motors.

10. In a Loran tracking receiver as described in claim 5 in which said indicator means includes motor driver display dials and a null meter.

* * * * *